United States Patent
Vora et al.

(10) Patent No.: US 10,108,411 B2
(45) Date of Patent: Oct. 23, 2018

(54) SYSTEMS AND METHODS OF CONSTRUCTING A NETWORK TOPOLOGY

(71) Applicant: Lightbend, Inc., San Francisco, CA (US)

(72) Inventors: Abhinav A. Vora, San Francisco, CA (US); Aiyesha Lowe Ma, Sunnyvale, CA (US); Amit Sasturkar, San Jose, CA (US); Oliver Kempe, Santa Clara, CA (US); Narayanan Arunachalam, Fremont, CA (US); Alan Ngai, Santa Clara, CA (US); Vishal Surana, Sunnyvale, CA (US); Omer Emre Velipasaoglu, San Francisco, CA (US)

(73) Assignee: Lightbend, Inc., San Francisco, CA (US)

( * ) Notice: Subject to any disclaimer, the term of this patent is extended or adjusted under 35 U.S.C. 154(b) by 5 days.

(21) Appl. No.: 15/289,080

(22) Filed: Oct. 7, 2016

(65) Prior Publication Data
US 2017/0104636 A1 Apr. 13, 2017

Related U.S. Application Data

(60) Provisional application No. 62/239,224, filed on Oct. 8, 2015.

(51) Int. Cl.
*H04L 12/24* (2006.01)
*G06F 8/65* (2018.01)
(Continued)

(52) U.S. Cl.
CPC ............ *G06F 8/65* (2013.01); *H04L 41/0853* (2013.01); *H04L 41/12* (2013.01); *H04L 43/0817* (2013.01); *H04L 67/34* (2013.01)

(58) Field of Classification Search
CPC ........ G06F 8/65; H04L 43/0817; H04L 41/12; H04L 41/0853; H04L 67/34
See application file for complete search history.

(56) References Cited

U.S. PATENT DOCUMENTS

| 8,984,116 | B2 | 3/2015 | Ge et al. |
| 9,037,571 | B1 * | 5/2015 | Baranowski ...... G06F 17/30958 707/716 |

(Continued)

OTHER PUBLICATIONS

U.S. Appl. No. 15/289,115—Office Action dated Jul. 3, 2018, 24 pages.

(Continued)

*Primary Examiner* — Hassan Kizou
*Assistant Examiner* — Hector Reyes
(74) *Attorney, Agent, or Firm* — Haynes Beffel & Wolfeld LLP; Ernest J. Beffel, Jr.

(57) ABSTRACT

The technology disclosed relates to sub-clustering within service clusters in real-time. In particular, it relates to accessing a network topology that records node data and connection data including processes running on numerous hosts grouped into local services on the hosts, the local services running on multiple hosts grouped into service clusters and sub-clusters of service clusters, and network connections used by the service clusters to connect the hosts grouped into service connections, wherein the node data includes software versions of the processes and process data with configuration files and clustering the multiple hosts with the service clusters into the sub-clusters based at least in part on the software versions.

10 Claims, 10 Drawing Sheets

(51) Int. Cl.
*H04L 29/08* (2006.01)
*H04L 12/26* (2006.01)

(56) References Cited

U.S. PATENT DOCUMENTS

| | | | |
|---|---|---|---|
| 9,558,056 B2 | 1/2017 | Sasturkar et al. | |
| 9,632,858 B2 | 4/2017 | Sasturkar et al. | |
| 9,904,583 B2* | 2/2018 | Davidson | G06F 9/5083 |
| 2003/0225876 A1 | 12/2003 | Oliver et al. | |
| 2005/0188240 A1 | 8/2005 | Murphy et al. | |
| 2005/0219151 A1 | 10/2005 | Li et al. | |
| 2008/0155335 A1 | 6/2008 | Klein et al. | |
| 2010/0027432 A1 | 2/2010 | Gopalan et al. | |
| 2010/0128600 A1 | 5/2010 | Srinivasmurthy et al. | |
| 2013/0055020 A1 | 2/2013 | Krishnan et al. | |
| 2013/0110761 A1 | 5/2013 | Viswanathan et al. | |
| 2014/0129876 A1 | 5/2014 | Addepalli et al. | |
| 2014/0173336 A1 | 6/2014 | Bennah et al. | |
| 2015/0033056 A1 | 1/2015 | Frank et al. | |
| 2015/0033080 A1 | 1/2015 | Lee | |
| 2016/0078220 A1* | 3/2016 | Scharf | G06F 21/51 726/1 |
| 2016/0142262 A1 | 5/2016 | Werner et al. | |
| 2016/0188340 A1* | 6/2016 | Fushimi | G06F 15/163 712/225 |
| 2016/0217022 A1 | 7/2016 | Velipasaoglu et al. | |
| 2016/0335070 A1 | 11/2016 | Aw et al. | |
| 2017/0046146 A1 | 2/2017 | Jamjoom et al. | |
| 2017/0048110 A1 | 2/2017 | Wu et al. | |
| 2017/0078366 A1* | 3/2017 | Jung | H04L 67/10 |
| 2017/0102933 A1 | 4/2017 | Vora et al. | |
| 2017/0147417 A1 | 5/2017 | Sasturkar et al. | |
| 2017/0230229 A1 | 8/2017 | Sasturkar et al. | |
| 2017/0302532 A1 | 10/2017 | Maes | |
| 2017/0324828 A1 | 11/2017 | Clavera et al. | |

OTHER PUBLICATIONS

U.S. Appl. No. 14/276,846—Office Action dated Nov. 23, 2015, 13 pages.
U.S. Appl. No. 14/276,826—Office Action dated Jan. 11, 2016, 20 pages.

* cited by examiner

SYSTEMS AND METHODS OF CONSTRUCTING A NETWORK TOPOLOGY

CROSS-REFERENCE TO OTHER APPLICATIONS

This application claims the benefit of U.S. Provisional Patent Application No. 62/239,224, entitled, "SYSTEMS AND METHODS OF CONSTRUCTING AND MONITORING A NETWORK TOPOLOGY," filed on Oct. 8, 2015. The provisional application is hereby incorporated by reference for all purposes.

US Nonprovisional Patent Application, entitled, "SYSTEMS AND METHODS OF MONITORING A NETWORK TOPOLOGY," filed contemporaneously herewith. The nonprovisional application is hereby incorporated by reference for all purposes.

U.S. provisional Patent Application 62/239,179, entitled, "CONTEXT-AWARE RULE ENGINE FOR ANOMALY DETECTION," filed on Oct. 8, 2015. The provisional application is hereby incorporated by reference for all purposes.

U.S. Provisional Patent Application No. 62/107,340, entitled, "ANOMALY DETECTION USING CIRCUMSTANCE-SPECIFIC DETECTORS," filed on Jan. 23, 2015. The provisional application is hereby incorporated by reference for all purposes.

U.S. Provisional Patent Application No. 62/169,489, entitled, "HIERARCHICAL SERVICE ORIENTED APPLICATION TOPOLOGY GENERATION FOR A NETWORK," filed on Jun. 1, 2015. The provisional application is hereby incorporated by reference for all purposes.

U.S. Nonprovisional patent application Ser. No. 14/276,826, entitled, "ORGANIZING NETWORK PERFORMANCE METRICS INTO HISTORICAL ANOMALY DEPENDENCY DATA," filed on May 13, 2014. The nonprovisional application is hereby incorporated by reference for all purposes.

U.S. Nonprovisional patent application Ser. No. 14/276,846, entitled, "ORGANIZING NETWORK PERFORMANCE METRICS INTO HISTORICAL ANOMALY DEPENDENCY DATA," filed on May 13, 2014. The nonprovisional application is hereby incorporated by reference for all purposes.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Modern applications run on distributed computer systems over complex architectures where component and system statuses are monitored by collecting at regular intervals performance metrics such as CPU, memory, disk and network usage, and system service level agreements (SLAs). Further, the advent of cloud computing and on-line services has led to exponential growth in size and complexity of data centers. This has created unprecedented challenges for system management and monitoring. Given the scale and scope of such large data centers, network operators and monitoring tools are overwhelmed with monitoring and analyzing performance metrics across several thousand network layers and network elements. Currently, network operators and monitoring tools conduct much of the forensic examination based on communications between numerous hosts of a network. Such a host-based network analysis creates a cloud picture of the network health with numerous noise channels that can be obviated.

It is therefore necessary to provide methods and systems that enhance the transparency and feasibility of the network monitoring and analytics metrics. An opportunity arises to increase operator-friendliness in network monitoring environments. Improved user experience and engagement and higher customer satisfaction and retention may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
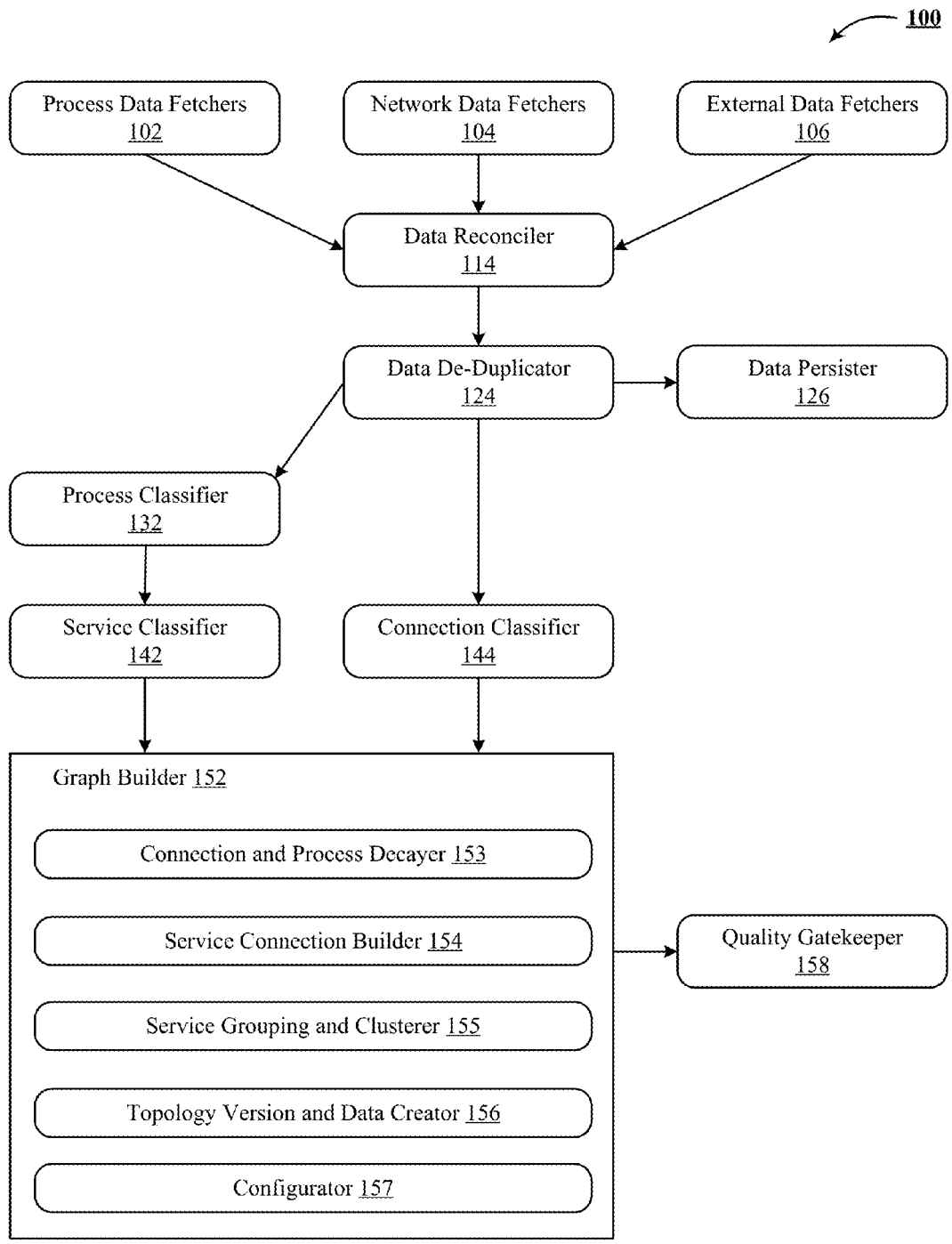
FIG. 1 depicts an exemplary environment of constructing and monitoring a network topology.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Introduction

Anomalies refer to any unexpected changes in a data stream. The technology disclosed can be applied to correlating anomalies in data streams that exist in a variety of applications including, information technology (IT) systems, telecommunications systems, financial systems, security trading, banking, business intelligence, marketing, mining, energy, etc. One implementation of the technology disclosed relates to IT systems operations. IT operational data refers to any data that is produced by any human, system (hardware or software), machine, application, software, or component within an IT environment. Some examples of this operational data include metrics (server, network, database, services, hypervisor), alerts, logs, errors, software pushes, or application topology.

Unexpected changes in operational data i.e. anomalies are important for a number of reasons such as understanding the health of the system, alerting for system failures, or identifying the cause and symptoms for failures. One particular use of anomalies is to identify the most likely cause and symptom of system failures, and thereby enable faster resolution of these system failures. Any non-trivial system or data stream can have several anomalies in progress at any given time and manually inspecting all anomalies to identify the actual cause of a failure can be a very time-consuming, cumbersome, and error prone process. Therefore, systems and methods that correlate anomalies across a network and identify the different relationships among the correlated anomalies can be very useful to network operators and end consumers.

Further, as the scale and complexity of a network grows, the number of detected anomalies and alarms about the detected anomalies raised by the network monitoring tools also increase. As a result, the task of identifying root causes of the anomalies and mitigating them becomes unmanageable. In addition, IT infrastructures are dynamic and constantly changing. There are many ways of representing systems state for any particular snapshot of time, such as graphs of various resource metrics (e.g. network bandwidth, CPU utilization, etc.), resource topologies, health dashboards, etc. However, currently, there is no good way to see how such system states evolve over time.

Examples of systems, apparatus, and methods according to the disclosed implementations are described in an information technology context. In other instances, the technology disclosed may be applied to fraud detection, telecommunications systems, financial systems, security trading, banking, business intelligence, marketing, mining, energy, etc. Other applications are possible, such that the following examples should not be taken as definitive or limiting either in scope, context or setting.

The technology disclosed relates to detecting anomalous behavior of network components in a complex network setting by using computer-implemented systems. The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

Moreover, the technology disclosed can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

The technology disclosed can be implemented using different programming models like MapReduce™, bulk synchronous programming, MPI primitives, etc. or different stream management systems like Apache Storm™, Apache Spark™, Apace Kafka™, Truviso™, IBM Info-Sphere™, Borealis™ and Yahoo! S4™.

Real-time data processing is defined as an unbounded sequence of event tuples being processed in parallel and distributed among multiple worker nodes. In one implementation, real-time data processing is defined as a collection of real-time events for a task sequence or a particular stage of a task sequence. In another implementation, real-time data processing is defined as a collection of events that are registered as they are generated by an entity. In one implementation, real-time data processing is defined as processing of unbounded sequence of data tuples at an emission rate of one million events or tuples per second.

A "stream processing framework" is defined as a real-time stream processing system that represents an entire streaming application as a graph of computation. In some implementations, the stream processing framework process real-time metric and other data to generate real-time analytics.

Network Topology Construction and Monitoring Environment

FIG. 1 depicts an exemplary environment 100 of constructing and monitoring a network topology. Network topology is defined as a physical and/or logical topology of resources (wireless devices, switches, routers, firewalls, servers, databases) in a network. In one implementation, physical topology refers to the geometric shape of the layout of the physical resources used in the network. In another implementation, logical topology represents active communication paths of data flow among the resources in the network. Examples of logical network topologies include point-to-point, bus, ring, star, tree, mesh, daisy chain, or hybrid. FIG. 1 includes process data fetchers 102, network data fetchers 104, external data fetchers 106, data reconciler 114, data de-duplicator 124, data persister 126, process classifier 132, service classifier 142, connection classifier 144, graph builder 152 and quality gatekeeper 158. Graph builder 152 includes connection and process decayer 153, service connection builder 154, service grouping and clusterer 155, topology version and data creator 156 and configurator 157. In other implementations, environment 100 may not have the same elements or components as those listed above and/or may have other/different elements or components instead of, or in addition to, those listed above, such as a performance metrics data store, anomalous instance data store, baseline data store, user feedback data store, crowd sourced data store, assembly engine, correlation engine, detection engine, ranking engine, graphics engine, user computing device, application or network(s). The different elements or components can be combined into single software modules and multiple software modules can run on the same hardware.

The actual communication path between the different components described above can be point-to-point over public and/or private networks. Some items, such as quality gatekeeper 158, might be delivered indirectly, e.g. via an application store (not shown). All of the communications can occur over a variety of networks, e.g. private networks, VPN, MPLS circuit, or Internet, and can use appropriate APIs and data interchange formats, e.g. REST, JSON, XML, SOAP and/or JMS. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as Ethernet, EDGE, 3G, 4G LTE, Wi-Fi and WiMAX. Additionally, a variety of authorization and authentication techniques, such as username/password, OAuth, Kerberos, SecureID, digital certificates and more, can be used to secure the communications.

In some implementations, the different components described above can be of varying types including a workstation, server, computing cluster, blade server, server farm, or any other data processing system or computing device. The components can be communicably coupled to the databases via a different network connection. For example, process data fetchers 102 and data reconciler 114 can be coupled via the network (e.g., the Internet), process classifier 132 can be coupled via a direct network link, and graph builder 152 can be coupled by yet a different network connection.

In one implementation, the different components described above are highly scalable real-time stream processing engines using a combination of stream processing frameworks and batch processing frameworks. A stream processing framework provides real-time processing of sequences of unbounded events from metric streams for delivery of immediate analytics and insights based on the events as they are occurring. In one implementation, such as stream processing framework processes a million events per second per node. This stream processing framework can be implemented using one or more stream processors like Apache Storm™ and Apache Samza™ or a batch-stream processor such as Apache Spark™. In one implementation, such as stream processing framework includes an API to write jobs that run over a sequence of event-tuples and perform operations over those event-tuples.

An example of a batch processing framework implementing a MapReduce programming model over a Hadoop distributed file system (HDFS).

In some implementations, metric streams are collections of events that are registered in environment 100 as they are generated. In one implementation, events are delivered over HTTP to an input pipeline such as Apache Kafka™. In another implementation, events are transmitted via POST requests to a receiver operating on behalf of the input pipeline. In other implementations, metric streams are streams of JSON objects including metadata about the metrics. These JSON objects are stored in a schema-less or NoSQL key-value data-store like Apache Cassandra™, Google's BigTable™, HBase™, Voldemort™, CouchDB™, MongoDB™ Redis™, Riak™, Neo4J™, etc., which stores the parsed JSON objects using key spaces that are equivalent to a database in SQL. Each key space is divided into column families that are similar to tables and comprise of rows and sets of columns.

In some implementations, a batch processing framework operating on the metric streams detects anomalies using OnLine Analytical Processing (OLAP) queries, which are stored in a batch store. In one implementation, anomalous events are stored in the batch store to act as a backup for raw events on which batch processing jobs can run at any given time. The batch store, in some implementations, provides raw counts as well as descriptive statistics such as mean, median and percentile breakdowns. In one implementation, analytics tool like Scalding™ and Pig™ operate on the batch store to provide retrospective analysis, machine learning modeling, and other batch analytics. In yet other implementations, the batch store is used to correct errors made by real-time stream processing or to handle upgraded capabilities by running analytics on historical data and recompute results.

Fetching Data from Multiple Sources

Process data fetchers 102, network data fetchers 104 and external data fetchers 106 fetch different types of machine data from different sources. The technology disclosed employs one or more agents to collect machine specific information such as running processes, network connections and data transferred on each network connection via various network interfaces. The collected data is pre-processed and stored in publish/subscribe queues for processing by the environment 100.

Process data fetchers 102 periodically download all process related information for a given customer account and send it to data reconciler 114. In some implementations, process data fetchers 102 also apply various optimization processes on the collected process data, such as data normalization, to enable efficient downstream processing.

Network data fetchers 104 periodically download all network information for a given customer account and send it to data reconciler 114. In one implementation, network data fetchers 104 also apply various processes on the collected network data to discover network hosts that might not have been initially discovered by the agent. In another implementation, network data fetchers 104 also apply various optimization processes on the collected network data, such as data normalization, to enable efficient downstream processing.

External data fetchers 106 are responsible for discovering other sources of information that assist in network and service discovery. In one implementation, external data fetchers 106 fetch information about the cloud services used by a customer through the service provider's respective APIs. In another implementation, external data fetchers 106 also discover and fetch information about managed cloud services utilized by a customer.

Process data fetchers 102, network data fetchers 104 and external data fetchers 106 keep the publish/subscribe queues nearly empty to ensure real-time processing. In some implementations, if the fetchers 102, 104 and 106 discover that the queues have a large number of messages, determined based on account size, number of data packets, age of packet, etc.), the fetchers then operate in an enhanced processing mode to meet the real-time guarantees.

In cases where information assembled by the different fetchers 102, 104 and 106 belongs to the same resource, data reconciler 114 identifies components that are logically or physically the same and consolidates information originated from the same resource. In one implementation, a plurality of consolidation parameters are used by data reconciler 114 to identify similar or same resources, including Internet Protocol (IPs) addresses, media access control (MACs) addresses, virtual private clouds (VPCs), domain name system (DNS), cloud service provider, resource identifiers (IDs), and others.

Deduplication of Connections, Resources and Processes

Data de-duplicator 124 de-duplicates metric streams and resources that generate those metric streams to enable efficient and real-time downstream processing. The agent collects different data at different time frequencies such as 10-90 seconds. This, in some implementations, results in negligible or no changes in data between each collection operation. In one implementation, data de-duplicator 124 de-duplicates collected data to prevent unnecessary re-computation based on a variety of de-duplication parameters, including connection destinations, connection ports, connection socket states, host names, host connection interfaces IDs, external information from cloud environment APIs, process signatures, process start times, and others.

In one example of resource de-duplication, if there are two machines, machine X and machine Y, and machine X starts a connection to machine Y, then the two agents on machines X and Y report the same connection. In such a scenario, machine X reports and outgoing connection to machine Y and machine Y reports and outgoing connection to machine X. Data de-duplicator 124 detects these two connections as having similar end-point resources and de-duplicates them into one connection having matching source/destination machine identities and/or matching port and associated port identification (PID).

Process Classification

Process classifier 132 classifies each host into local services using a combination of machine learnt classifiers and rules, as described in U.S. Provisional Patent Application No. 62/169,489, entitled, "HIERARCHICAL SERVICE ORIENTED APPLICATION TOPOLOGY GENERATION FOR A NETWORK," filed on Jun. 1, 2015 and incorporated herein.

In one implementation, process classifier 132 performs rule based classification in which a host service is classified to a particular service if a host of that host service has the matching processes of the particular service and all of the processes of the host service match a set of mandatory and optional processes of the particular service.

In another implementation, process classifier 132 performs machine learning based classification in which process commands are split into tokens and labelled by a human (e.g. customer, domain expert). The labelled data is then used to generate machine learning models for each service. Once the model is generated, it is used to make predictions on future machine data and refined over time as more and more machine data is collected and classified.

In yet another implementation, process classifier 132 performs process clustering in which processes are grouped together into host services based on their co-occurrences across hosts.

In some implementations, databases used in environment 100 can store information from one or more tenants into tables of a common database image to form a multi-tenant database system (MTS). A database image can include one or more database objects. In other implementations, the databases can be relational database management systems (RDBMSs), object oriented database management systems (OODBMSs), distributed file systems (DFS), no-schema database management systems, or any other data storing systems or computing devices.

While environment 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

Figure 2:
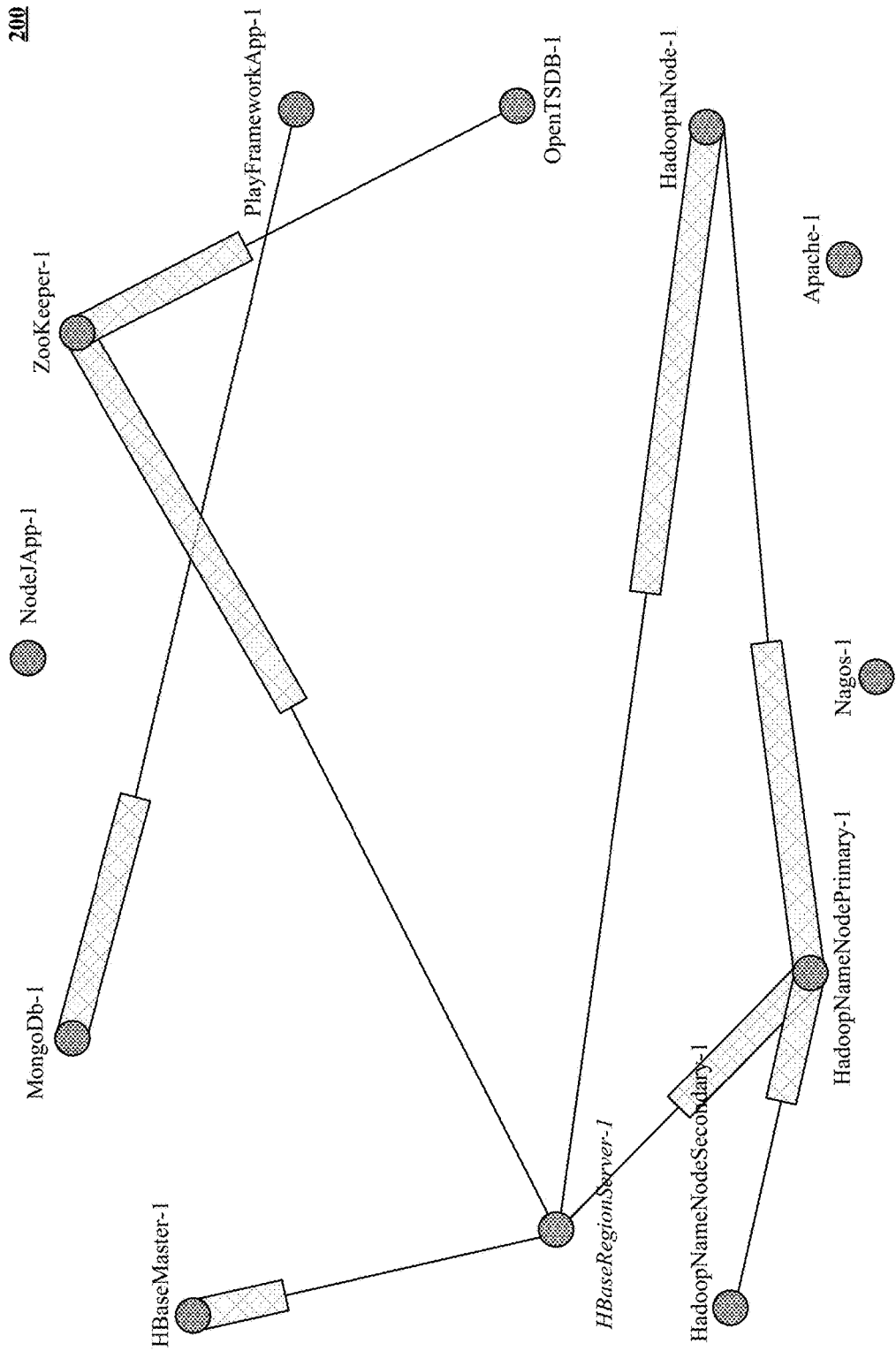
FIG. 2 shows one implementation of a first version of a network topology at time $t_0$.

FIG. 2 shows one implementation of a first version 200 of a network topology at time $t_0$. The technology disclosed takes a snapshot of the network topology at time $t_0$ and stores it as a first version.

Figure 3:
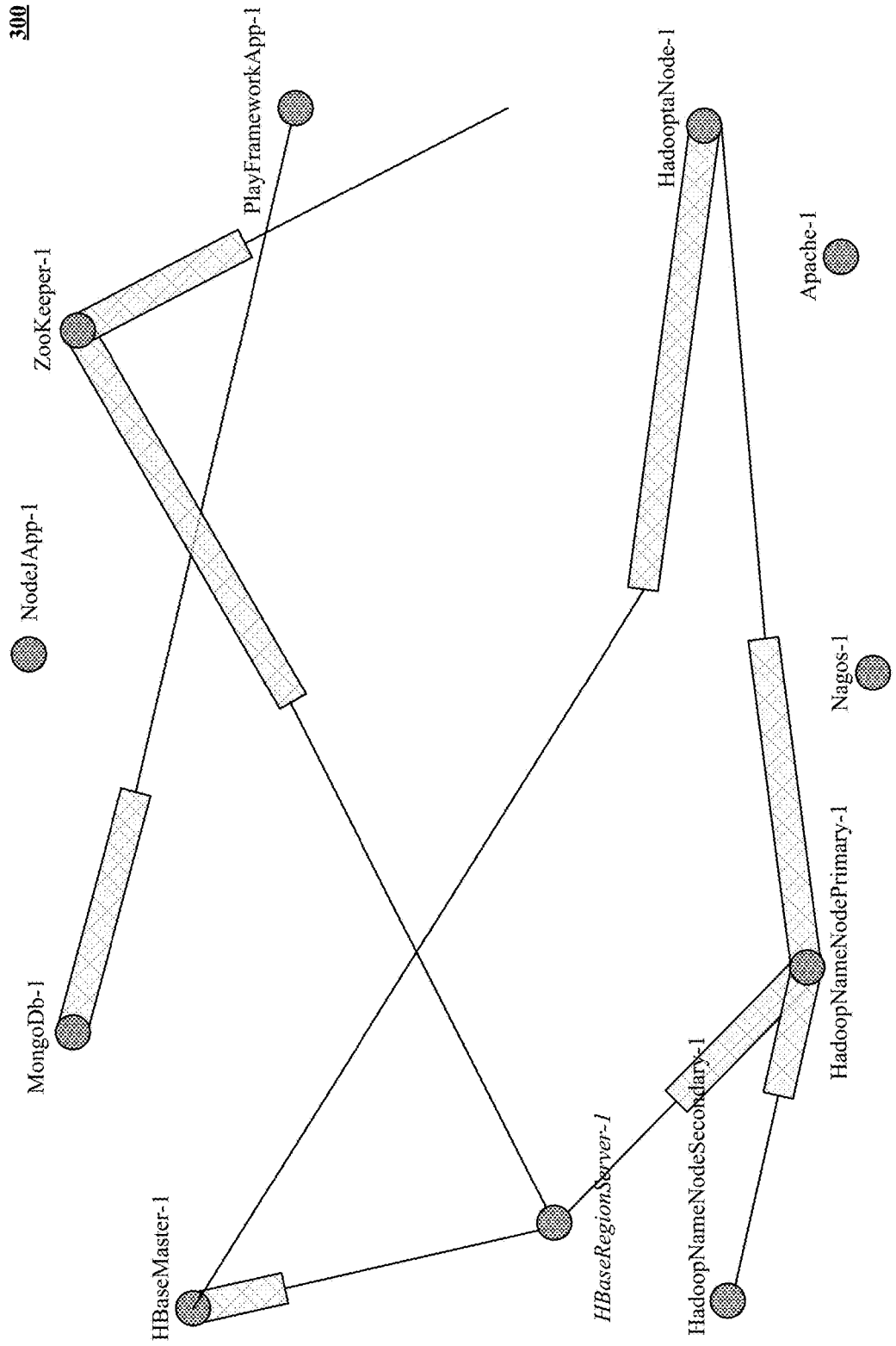
FIG. 3 shows one implementation of a second version of FIG. 2's network topology at time $t_1$.

FIG. 3 shows one implementation of a second version 300 of FIG. 2's network topology at time $t_1$. At time t1, the service connection between services "HadoopNode-1" and "HBaseRegionServer-1" is no longer there, and instead there is a new service connection between services "HadoopNode-1" and "HBaseMaster-1". The technology disclosed detects this change between the first and second version of the network topology. In addition, in the second version 300, network topology no longer has service "OpenTSDB-1". This change is also recorded by the technology disclosed.

Two examples can be used to describe the technology disclosed. In one implementation, an alarm can be avoided because of the environment 100, wherein the alarm can be an event or action such as drawing a service connection, creating a new service, or not deleting an existing connection or service. In another implementation, an alarm is detected by the environment 100 that normally would go unnoticed. The detection and avoidance of alarms can be accomplished with incomplete information. As well, the technology disclosed can determine when to create a new version of the topology, and how to determine the relevance of a new topology change, based on a Diff algorithm. The technology disclosed can also generate a graphical representation of the topology.

Topology Version and Delta Generation

A topology version and data creator 156 builds custom topologies incrementally based on the most recent information about the network resources. In one implementation, the topology version and data creator 156 builds the custom topologies, such that the custom topologies are reconciled with an existing (prior) topology that is presently available. This reconciliation is achieved using a delta topology generation algorithm.

In some implementations, when there are changes in one of the custom topologies, for example, with respect to an existing topology, the topology version and data creator 156 creates a new version to identify the custom topology. By creating the new version, the topology version and data creator 156 creates an environment in which a customer can early view the topology changes over time.

Furthermore, in some implementations, the reconciliation of the topologies is achieved in several phases. In one phase, prior known hosts, services, service memberships, and connections are reconciled between the custom topography and the existing topology. In another phase the topology version and data creator 156 identifies, with respect to the existing topology, which resources are no longer present or recently added along with filtering of certain types of services or services with certain features.

For example, in one implantation, the prior known hosts are reconciled by the topology version and data creator 156 by mapping prior known hosts to current hosts based on a combination of identifiers (IDs) such as agent IDs, cloud provider host IDs, internal IDs, and hostnames.

Additionally, in one implementation, the services are reconciled by the topology version and data creator 156 based on a type of service, an internally assigned label (which, for example, includes a combination of features used to group or split services of the same type), and a similarity of a host membership. In an implementation, the topology version and data creator 156 reconciles the service connections based on the both end points of a connection.

In one implementation, the topology version and data creator 156 identifies which resources are no longer present or recently added by enumerating a set of resources that are no longer present in the existing topology, resources that are non-existent in the (new) custom topology, and resources having changed details. During this phase of identifying the resources, in one implementation the topology version and data creator 156 filters out and/or ignores certain resources to provide a simpler view of the custom topology.

As an example of the filtering performed by the topology version and data creator 156, suppose a customer uses cloud provider managed services such as a load balancer and a database, but the customer only installs agents on their production machines. One filtering option of the topology version and data creator 156 will allows unconnected services of particular types to be ignored. This feature allows the customer to hide the load balancer and the database used as part of the non-production environment.

As another an example of the filtering performed by the topology version and data creator 156, the topology version and data creator filters out services that concurrently occur with a particular type of service. Suppose there is a service running having a main purpose to run other jobs and tasks (e.g., Hadoop®). In this case, the topology version and data creator 156 performs the filtering by allowing excluding and/or including services of particular types that occur on the same hosts to be identified as the job service.

In one implementation, the topology version and data creator 156 creates a set of events corresponding to changes and being organized in a hierarchical manner. These events are both displayed in a user interface (UI) and fed to a notification system, which triggers alerts of varying levels of importance to users within the customer's organization.

Gatekeeper and Quality Assurance (QA) Process

The quality gatekeeper 158 generates a QA report for each custom topology that consists of a type and a quantity of each alteration with respect to the custom topology.

In one implementation, based on the QA report and other factors (e.g., a time since a last publication of a topology, whether a customer is a new customer, etc.), the quality gatekeeper 158 algorithmically determines whether a change in a customer topology is likely to match real (e.g., intended) changes and triggers an internal alert, when appropriate. Accordingly, changes in a customer topology that could result from data or processing issues are blocked from customer visibility until manually reviewed.

Auto-Scaling Process in some implementation, an auto-scaling process is performed by the external data fetchers 106, For example, the external data fetchers 106 continuously obtain a list of valid and new accounts, use information to determine a QoS (Quality of Service) and a load for each account, and auto-adjust a level of parallelism/correspondence of various components. In one implementation, the information used by the data fetchers 106 to determine the QoS and the load for each account includes a total number of accounts, agents managed for each account, a last topology generated time, SLAB, a number of hosts, a number of services, a rate of new service creation and deletion, etc.

Creating Configuration Information

In one implementation, once the topology version and data creator 156 identifies services in a topology, the configurator 157 creates configuration information for an agent to automatically configure the agent to collect relevant data for the identified services using either well-known methods for that service or custom plugins.

In an implementation, the topology version and data creator 156 generates dashboards of metrics that the user can use for monitoring. For example, hundreds of metrics can be generated for each service. In an implementation, the topology version and data creator 156 uses proprietary methods (e.g., a topology configuration method, a data load method, a metric characteristic method, a past failure method, etc.) to determine relevant metrics and ranks them for monitoring purposes.

In another implementation, the configurator 157 and/or the topology version and data creator 156 will perform an automated alert.

Additional Real-Time Features

In order to achieve real-time processing and/or streaming, the environment 100, in some implementations, utilizes data compression methods and optimizes dataflow to reduce overhead and improve processing speed.

Additionally, in some implementations, the environment efficiently handles errors and backed-up pipelines so as to reduce processing delay and achieve real-time processing and/or streaming.

Furthermore, in some implementations, the data de-duplicator 124 is configured to perform de-duplication in real-time using incomplete information, such that the de-duplication process does not slow down the real-time processing of the environment 100, despite the lack of information.

Additional Features

In some implementations, the environment 100 is configured to support the Docker® software environment.

Additionally, in some implementations the environment 100 is configured to support customer isolation and/or the tiering of customers and their relationships.

In other implementations, the environment 100 is configured to provide network monitoring, as well as additional security aspects.

Service Discovery of Entire Stack

Examples of the changes that can be automatically detected by the environment include service discovery of an entire stack, addition or removal of machines to a given service, and monitoring metrics specific to the service for anomalies or events. For example, if a set of machines are discovered that run memcached, instead of creating a dashboard with all system metrics or aggregations of these metrics over the service cluster, a dashboard can be automatically created with metrics that are pertinent to memcached, including number of active connections, number of evictions, and cache miss ratio. This dashboard will have less information, but more relevant information, than a standard dashboard.

Service Version Discovery

Another example is a service version discovery. The ability of the technology disclosed to monitor a service includes the ability to detect the service as well as the version of the service, as different versions will have different metrics of interest. Version discovery also helps detect any mistakes in setting up a technology stack. In one implementation, version information can be obtained by parsing a process command to extract information such as version numbers present in the command. For example, the command "/usr/sbin/apache2-k start" includes "apache2", which indicates version 2.0 of apache.

In another example, a configuration file or configuration files identified in a command can indicate a version. The command "/usr/sbin/application.py-conf/usr/local/application/conf/config.json" does not include a version number. It is also not clear whether the json file identified corresponds to a file, or whether it is a parameter used by the application. So, opening and parsing the json object identified in the string can validate that it is a file. Publicly available applications have configurations files that have well defined formats, such as json, yml, and xml, which allow the use of a parser specific to the file format to extract the version information.

In another example, version information can be obtained through status calls through Application Program Interfaces (APIs). The command "/usr/sbin/application" does not contain any version information. However, the application can provide a status call API. In this example, this is a http request (e.g. GET/status.html) that can be used to check the status of an application running on a server. This check returns, among other things, the version of the application. Version specific monitoring becomes possible once the software version has been detected.

Software Deployment Detection

Software deployment can follow a predictable pattern that can be detected. For example, if a process becomes unavailable for a short duration, and this phenomenon is observed on several machines, then this can indicate a software deployment. In another example, if a machine goes out of rotation for a short period of time, but then comes back online, then this too can indicate a software deployment. This information can be obtained by examining network traffic patterns. As well, if a software version changes, then there is a software deployment. This information can be present in the command, or inside the configuration file of a command.

The technology disclosed can identify the computers that offer a specific service as part of an application, as well as an event such as a software deployment. Therefore, a failed software deployment can be identified when the corresponding process on a computer does not restart after a software deployment. In one implementation, this can be accomplished with a cron job or script that includes periodicity. For example, the following pseudo-code illustrates one implementation of a process to identify a failed software deployment:

```
current_ls = Set of local services on a machine
new_ls = Set of local services predicted to be running based on newly available process data
missing_ls = current_ls - new_ls
for each local service (ls) in missing_ls:
delta = current_time - last_seen_time(ls)
if delta < min_downtime or delta < max_downtime:
return False
T1, T2 = Last time stamp before service went down, First time when service came back up
if number of connections went down to 0 sometime before T1 and came back up sometime after T2, return True
Else return False
```

The number of connections is a useful metric, but may not always be the best. Each service has a set of pertinent metrics (e.g. size of cache, miss ratio for memcached) that may yield more information.

Another example of a useful metric can be service connection detection. As there can be multiple services run on each computer, network monitoring tools allow us to determine the services involved in a network connection. Thus rather than tracking anomalies on network connections, we can model behavioral patterns and detect anomalies on the service connections.

Service Connection Detection

In another implementation, detecting new service connection patterns can be accomplished by inferring services on external machines: By clustering external hosts, which are machines without agents, based on connectivity patterns, etc., we can identify groups of machines that are likely service providers. The clustering algorithm that can be used is very similar to the disjoint set clustering algorithm described in the previous patent. In that example, the inputs were lists of a group of processes running on machines, and the resulting disjoint sets were the sets of processes that always occurred together, which were likely to be services. The inputs in this implementation can be different, however. In this case, the inputs will be a list of set of external machines that communicate with known service clusters. The output will be a cluster of external machines, where each cluster exhibits connectivity patterns (with services) that are unique to machines in that cluster.

Because no tool can resolve a given network connection into a service connection due to the multitude of service run on machines, agents are used to report on connections established by hosts. When agents are present on both ends of a connection, the connection can readily be ascribed to a service cluster, as a service connections. More generally, when a network connection between two hosts is detected and the two hosts are in services that communicate with each other, the connection can be classified as a service connection.

A special case arises when one end of a connection is external to deployed hosts and monitoring agents deployed on the host. Then, information determined by the agents about a first end of the connection that is monitored and limited information about the external end of the connection can be used to infer service composition of the external end. For instance, if all machines in a service cluster establish connections on port 27017, the system can infer that an external service is running mongodb, the Mongo no-SQL database.

This knowledge base can be built automatically over a period of time. The service classifier described earlier allows the technology disclosed to classify a set of processes as a service. Network monitoring tools allow for the capture of port information along with processes. Thus, a statistical model can be built to detect a service running on an external machine based on its port and processes that reach out to that port.

The above clustering algorithm also helps in detecting unexpected connection patterns (e.g. an external host having direct access to database service). In this example, the clusters can be automatically presented by the technology disclosed for inclusion into a network blacklist to disallow these connections.

Monitoring Service Connection Statistics

Once services and service connections have been detected on all relevant machines, connection patterns can be monitored for changes, and statistics can be generated by the technology disclosed. An example statistic that can be generated can be the aggregate number of requests to a set of web servers). The number of network connections that are part of a service connection can also be modelled as a time series.

Intra Service Clustering

Anomalous hosts can be detected within a service group if the connectivity patterns of sub-groups are different. Co-location of other local services and software versions can also be used to distinguish these sub-groups. For example, this can be expected when different local services receiving connections from different load balancers). But sometimes, it may be due to network or service misconfiguration, or faulty network equipment. A sample list of features can include the number of connections with other services in a time window (one number for each service cluster), and a Boolean value that indicates whether a collocated service that runs on one machine running the same local service also occurs on other machines running the same local service. This can require one Boolean value for each of these collocated services.

The software version of each local service can also affect the metrics pertinent to the given service. Once the service a machine runs is known, the pertinent metrics are known. The values of these metrics can be used to detect outliers.

For example, in one implementation a service S1 runs on machines M1, M2, and M3. M1 talks to services S2 (10 times) and S3 (5 times). M2 and M3 talk to S2 (6 times) only. M1 also runs S4 whereas M2 and M3 do not. S1 on each of the machines has version 'X'. The only pertinent metric for S1 is % cpu utilization. Values for % cpu utilization M1, M2 and M3 are 30%, 20%, 15% respectively. Pertinent metric for S4 is % memory. Values for M1, M2, and M3 are 50%, 40%, and 40%, respectively. Based on the information above, the feature vectors for M1, M2, M3 will be:

M1: (10,5,True,X,30,50)
M2: (6,0,False,X,20,40)
M3: (6,0,False,X,15,40)

From the representation above, it can be inferred that M2 and M3 are more similar to each other while M1 is an outlier. However, such a representation combines features of different types (numeric, categorical) and hence cannot be fed to any clustering algorithm. Features must thus be normalized. A transformation to normalize categorical data can introduce dummy Boolean variables, one for each category. Scaling of these dummy variables can occur so that one categories get more weight than another. Numerical variables can be normalized by scaling (e.g. fraction of the largest possible value, mean absolute deviation, deviation as a fraction of the standard deviation). These transformations will transform the above vectors into numerical feature vectors which can then be fed to a clustering algorithm. A hierarchical clustering can then be used to identify cliques within a cluster. Existence of multiple cliques indicates that either the clusters are fundamentally different because they serve different purposes or because of faulty installation or management. Identified clusters can then be reported for analysis.

Missing Service Connection

Missing service connections can be detected as well. For example, if there is a server and a database that do not communicate, then that can be an anomaly. To accomplish this, a knowledge base is created of frequent service connections. In this example the following connections can be configured:

(Apache→MySQL), (Apache→Memcached), (PHP→Apache→MySQL)

The knowledge can be created by aggregating connection patterns across customers. A formal description of an algorithm can include a service connection chain, which can include a list of services (S1, S2, S3 . . . ) where S1→S2→S3. Chains can be of variable length, but can't have loops. A chain is made up of smaller chains, with the smallest chain being size 2. With an example of S1-S2-S3-S4, a list of the chains would include:

S1-S2
S2-S3
S3-S4
S1-S2-S3
S2-S3-S4
S1-S2-S3-S4

The formal description of an algorithm would also include the collection of all service chains for a given customer, and the collection of all service chains for each customer. It would also include the use of an apriori algorithm to find commonly occurring service chains. This becomes the knowledge base, which can be used to detect and report if a service connection between two given services is missing.

Smoothing Prediction Over-Time

It can be inferred from process data that a service has stopped, even when it has not. This event can occur, for example, when a well-known listening port for a service appears to have closed, but it has not. This event can happen if it includes faulty data collection, an agent failure, or software deployment. Rather than alerting immediately, predictions can be smoothed out using historical data. This introduces a lag during which, if the process data comes back within a predetermined amount of time, we will always predict that a local service runs on a given machine. The algorithm to do smoothing can depend upon several features such as service priority, number of affected local services, and limits of the number of alerts that a customer can handle per day. In one example, and algorithm can include the following:

Let P=Service Priority (one out of "high", "medium", "low").
Let T(P) be a threshold that's a function of service priority. T(P) is a configurable setting.
If CurrentTime−TimeLocalServiceWasLastSeen>T(P), predict that local service is not running
If prediction is that the local service is not running<X(P) % of machines belonging to the service cluster, do not alert the customer. X(P) is a configurable setting.

The knowledge of T(P), and X(P) can be aggregated for different services across customers. Customers themselves may be categorized (small, medium, large sized company, where size can be based on a variable such as number of employees. For example, larger sized companies tend to demand stricter guarantees on performance.

In another example, the network connections from an outside machine can be used to infer that a service is running even though the data from the original machine suggest otherwise. If connection attempts keep failing (e.g. abnormal latency), then using the 2 bits of information, it can be predicted that a local service had stopped functioning. Otherwise, it can be predicted that a service is running and no alarms would be triggered. This would then override the algorithm presented above.

Service/Connection Priority

In other words, instead of predicting that connections have "disappeared", which may be a temporary phenomenon or a result of faulty data connections, smoothing predictions can introduce a lag, which can prevent false alerts. If a drop in network connections or ad-hoc network connections is experienced, it may not be advisable to generate an alert. If the service involved is a low priority service, then missing connections need not trigger alarms.

Incomplete Information

The environment 100 relies on multiple sources of information to discover the topology. This information isn't always available or complete. There are multiple reasons why this can happen such as the source service is down, the agents were dead or unable to communicate with its home server, or too much load on various parts of the system caused messages to be delayed or lost. Given such incomplete or missing information, the environment 100 needs to continue to operate and make probabilistic decisions. When no information is received from an agent, it can be due to a machine failure, an agent failure, or other error condition that would cause agent data to be lost. In one implementation, in order to determine whether to create a new topology version, the environment 100 can look for network connections from other machines that terminate at the alerting agent, and look for network connections to or from the alerting agent.

In this example, the first step is to look for network connections from other machines that terminate or originate at the machine running the alerting agent. This can determine that the machine has not failed, and thus avoid deleting all services from that machine. For example, if there was a second agent reporting data with an active network connections originating from, or terminating at, the machine running the alerting agent, then we can conclude that the machine has not failed.

A second step could be to look for network connections to, or from, the alerting agent from specific ports. Since the environment 100 has created a port map of processes and services, it can be determined if a specific service is alive on the machine or not. For example, if there was a third agent reporting a live network connection from itself to a known port (port L) on the machine running the alerting agent, then it can be concluded that the service listening on port L is alive.

Since the services running on a machine are known, and it is determined by the environment 100 that there is a master machine or process that manages instances of the services, an agent can query the master machine or process for the instances of each service that it manages. This helps identify services that should not be deleted. For example, the Storm Master machine maintains a list of all its workers in the cluster. This list can be queried on a well-known port using HTTP to determine the currently active instances.

In another example, an aging process can notify an operator to manually examine and correct any errors. The aging process can use statistics about the past lifetime of a process and the machines it runs on. If it is determine from the statistics that it is common for a process to be stopped for unusually large durations, then it will delay creating a notification for that particular service/machine pair until after the duration for an outage for that service.

The environment 100 collects information from multiple sources. Sometimes a particular source may have no information about a particular machine. In one example, this can be caused by the source not being available. Such incomplete information can cause problems with identifying a machine, such as by name, by IP address, MAC address, external resource IDs, and VPCs. When any such identifiable information isn't present some components can fail. The environment 100 uses an algorithm to create a unique identity of a machine by using other attributes of the machine. The algorithm is based on MinHashing a number of attributes associated with the host such as its name, IP address, and MAC address. For example, a first machine can have a set of attributes such as [dns name: staging.prod.opsclarity.com, IP address: 192.168.0.1, Mac address: 22:22:22:22:22:22, external id: i-12334, agent ID: a-987654, vpc id: v-555555]. Now at a point in the future, if one of the above attributes were missing, such as the external id, then a naive system could see this as a different machine. In this situation, the original information can be compared to the current information of [dns name: staging.prod.opsclarity.com, IP address: 192.168.0.1, Mac address: 22:22:22:22:22:22, agent ID: a-987654, vpc id: v-555555] and determine that these two sets are about 80% similar. This can be combined with a statistic that shows the missing information has a history of being missing a certain % of times to conclude that these are the same machines.

Flowcharts

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as introduction, rule design system, operators and rule grammar, domain rules, ensemble rules, etc.

Figure 4:
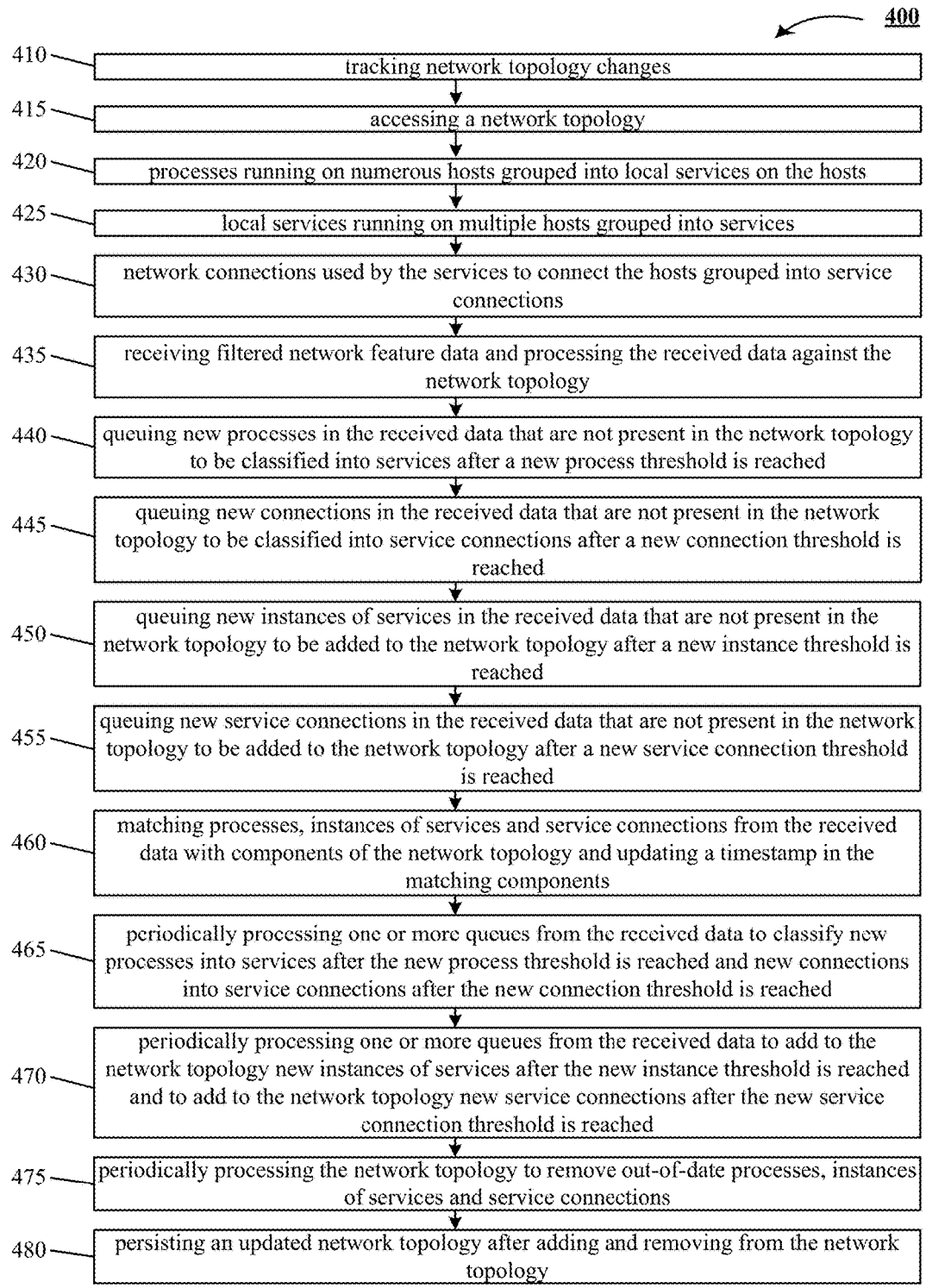
FIG. 4, FIG. 5, FIG. 6, FIG. 7, FIG. 8 and FIG. 9 illustrate flowcharts of various implementations of the technology disclosed.

FIG. 4 shows one implementation of a flowchart 400. Flowchart 400 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 4. Multiple actions can be combined in some implementations. For convenience, this workflow is described with reference to the system that carries out a method. The system is not necessarily part of the method.

At action 410, the method includes tracking network topology changes, as described supra.

At action 415, the method includes accessing a network topology, as described supra.

At action 420, the method includes processes running on numerous hosts grouped into local services on the hosts, as described supra.

At action 425, the method includes local services running on multiple hosts grouped into services, as described supra.

At action 430, the method includes network connections used by the services to connect the hosts grouped into service connections, as described supra.

At action 435, the method includes receiving filtered network feature data and processing the received data against the network topology, as described supra.

At action 440, the method includes queuing new processes in the received data that are not present in the network topology to be classified into services after a new process threshold is reached, as described supra.

At action 445, the method includes queuing new connections in the received data that are not present in the network topology to be classified into service connections after a new connection threshold is reached, as described supra.

At action 450, the method includes queuing new instances of services in the received data that are not present in the network topology to be added to the network topology after a new instance threshold is reached, as described supra.

At action 455, the method includes queuing new service connections in the received data that are not present in the network topology to be added to the network topology after a new service connection threshold is reached, as described supra.

At action 460, the method includes matching processes, instances of services and service connections from the received data with components of the network topology and updating a timestamp in the matching components, as described supra.

At action 465, the method includes periodically processing one or more queues from the received data to classify new processes into services after the new process threshold is reached and new connections into service connections after the new connection threshold is reached, as described supra.

At action 470, the method includes periodically processing one or more queues from the received data to add to the network topology new instances of services after the new instance threshold is reached and to add to the network topology new service connections after the new service connection threshold is reached, as described supra.

At action 475, the method includes periodically processing the network topology to remove out-of-date processes, instances of services and service connections, as described supra.

At action 480, the method includes persisting an updated network topology after adding and removing from the network topology, as described supra.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as introduction, rule design system, operators and rule grammar, domain rules, ensemble rules, etc.

Figure 5:
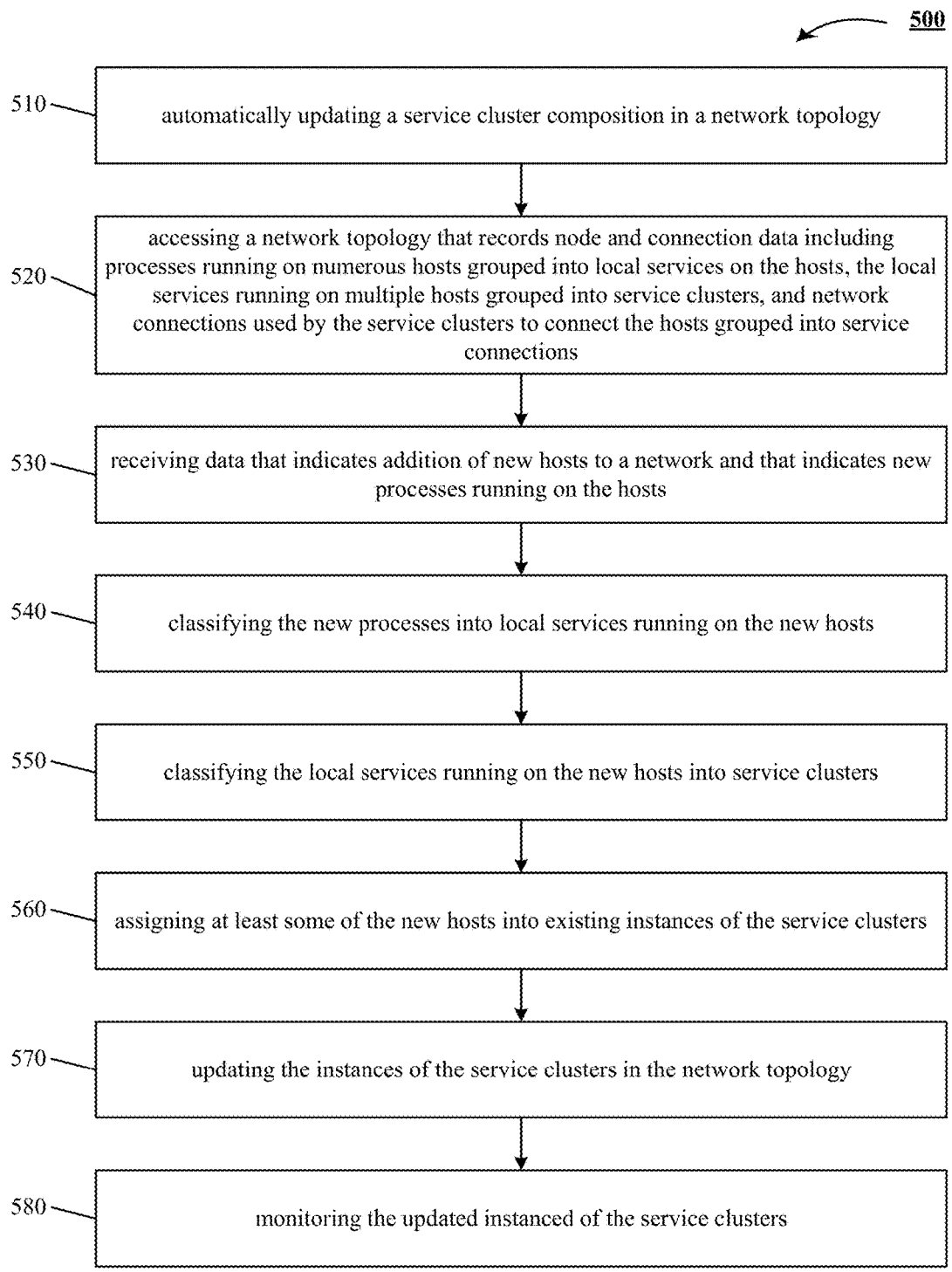

FIG. 5 shows one implementation of a flowchart 500. Flowchart 500 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 5. Multiple actions can be combined in some implementations. For convenience, this workflow is described with reference to the system that carries out a method. The system is not necessarily part of the method.

At action 510, the method includes automatically updating a service cluster composition in a network topology, as described supra.

At action 520, the method includes accessing a network topology that records node and connection data including processes running on numerous hosts grouped into local services on the hosts, the local services running on multiple hosts grouped into service clusters, and network connections used by the service clusters to connect the hosts grouped into service connections, as described supra.

At action 530, the method includes receiving data that indicates addition of new hosts to a network and that indicates new processes running on the hosts, as described supra.

At action 540, the method includes classifying the new processes into local services running on the new hosts, as described supra.

At action 550, the method includes classifying the local services running on the new hosts into service clusters, as described supra.

At action 560, the method includes assigning at least some of the new hosts into existing instances of the service clusters, as described supra.

At action 570, the method includes updating the instances of the service clusters in the network topology, as described supra.

At action 580, the method includes monitoring the updated instanced of the service clusters, as described supra.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as introduction, rule design system, operators and rule grammar, domain rules, ensemble rules, etc.

Figure 6:
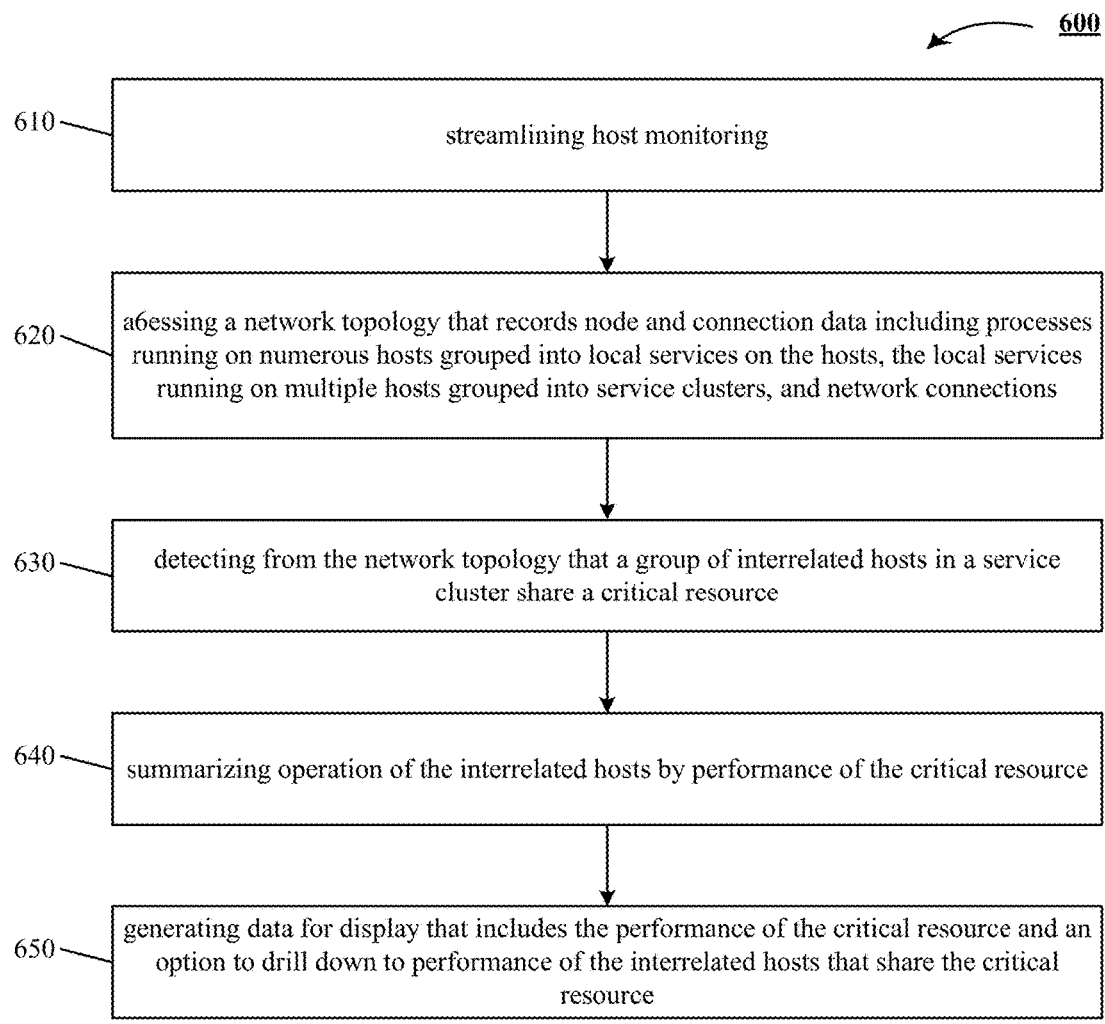

FIG. 6 shows one implementation of a flowchart 600. Flowchart 600 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 6. Multiple actions can be combined in some implementations. For convenience, this workflow is described with reference to the system that carries out a method. The system is not necessarily part of the method.

At action 610, the method includes streamlining host monitoring, as described supra.

At action 620, the method includes accessing a network topology that records node and connection data including processes running on numerous hosts grouped into local services on the hosts, the local services running on multiple hosts grouped into service clusters, and network connections, as described supra.

At action 630, the method includes detecting from the network topology that a group of interrelated hosts in a service cluster share a critical resource, as described supra.

At action 640, the method includes summarizing operation of the interrelated hosts by performance of the critical resource, as described supra.

At action 650, the method includes generating data for display that includes the performance of the critical resource and an option to drill down to performance of the interrelated hosts that share the critical resource, as described supra.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as introduction, rule design system, operators and rule grammar, domain rules, ensemble rules, etc.

Figure 7:
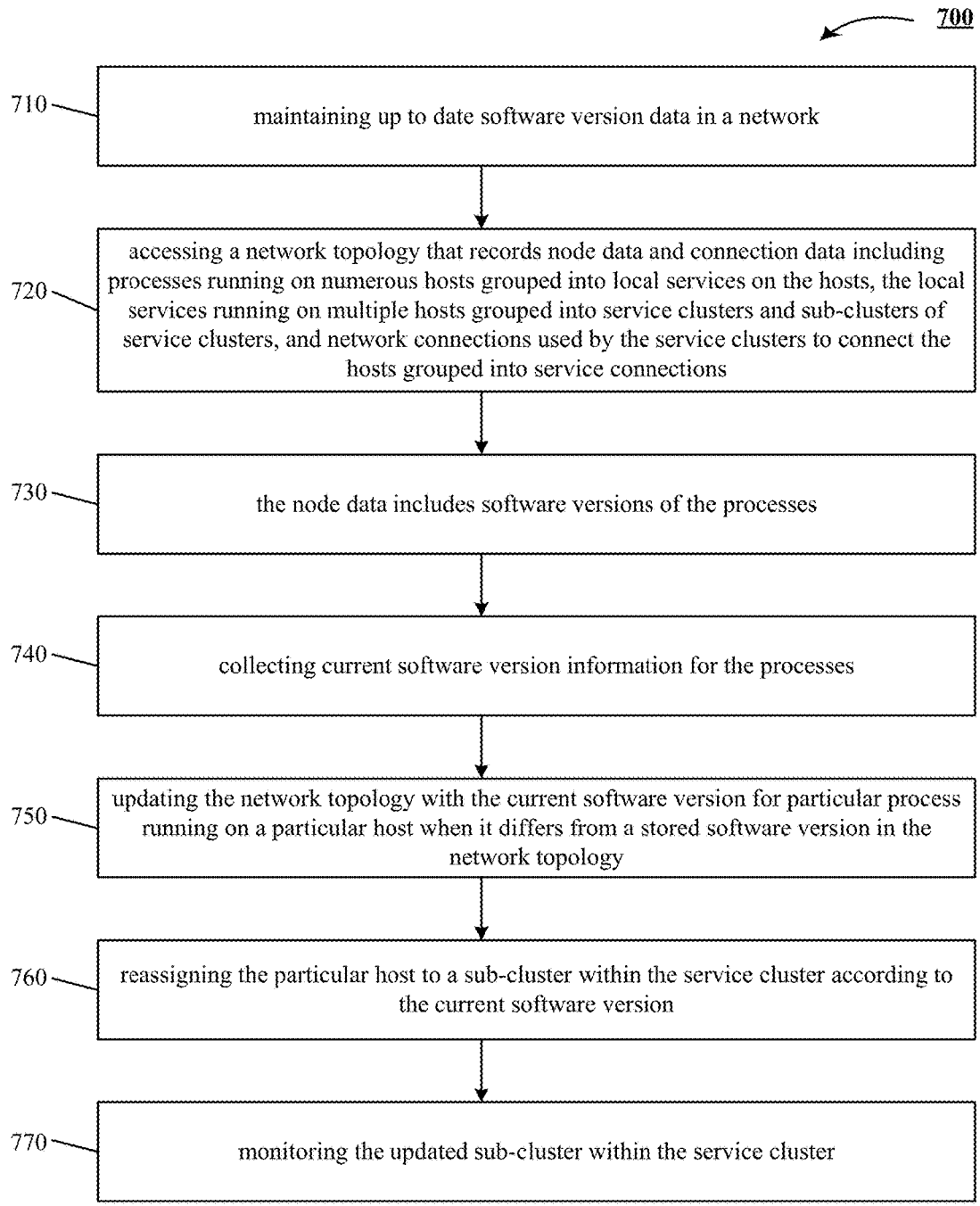

FIG. 7 shows one implementation of a flowchart 700. Flowchart 700 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 7. Multiple actions can be combined in some implementations. For convenience, this workflow is described with reference to the system that carries out a method. The system is not necessarily part of the method.

At action 710, the method includes maintaining up to date software version data in a network, as described supra.

At action 720, the method includes accessing a network topology that records node data and connection data including processes running on numerous hosts grouped into local services on the hosts, the local services running on multiple hosts grouped into service clusters and sub-clusters of service clusters, and network connections used by the service clusters to connect the hosts grouped into service connections, as described supra.

At action 730, the method includes the node data includes software versions of the processes, as described supra.

At action 740, the method includes collecting current software version information for the processes, as described supra.

At action 750, the method includes updating the network topology with the current software version for particular process running on a particular host when it differs from a stored software version in the network topology, as described supra.

At action 760, the method includes reassigning the particular host to a sub-cluster within the service cluster according to the current software version, as described supra.

At action 770, the method includes monitoring the updated sub-cluster within the service cluster, as described supra.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as introduction, rule design system, operators and rule grammar, domain rules, ensemble rules, etc.

Figure 8:
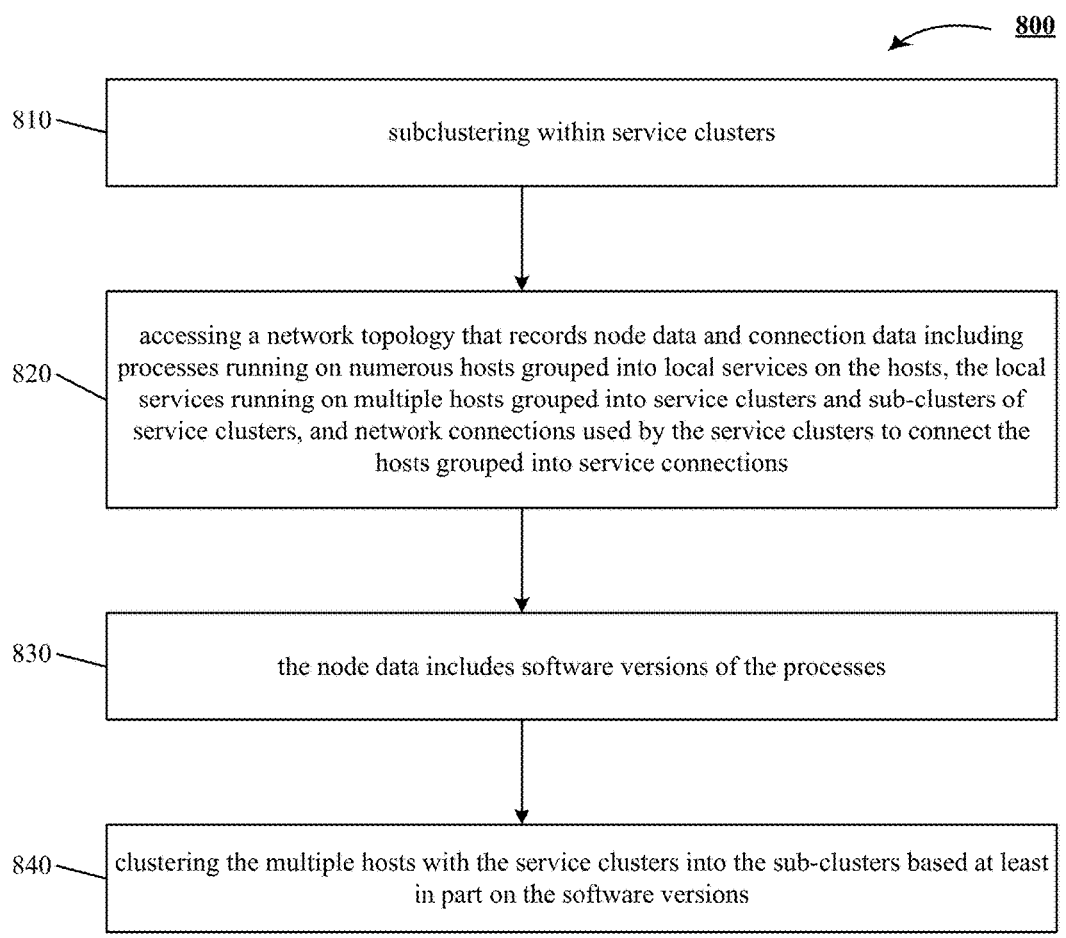

FIG. 8 shows one implementation of a flowchart 800. Flowchart 800 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 8. Multiple actions can be combined in some implementations. For convenience, this workflow is described with reference to the system that carries out a method. The system is not necessarily part of the method.

At action 810, the method includes subclustering within service clusters, as described supra.

At action 820, the method includes accessing a network topology that records node data and connection data including processes running on numerous hosts grouped into local services on the hosts, the local services running on multiple hosts grouped into service clusters and sub-clusters of service clusters, and network connections used by the service clusters to connect the hosts grouped into service connections, as described supra.

At action 830, the method includes the node data includes software versions of the processes, as described supra.

At action 840, the method includes clustering the multiple hosts with the service clusters into the sub-clusters based at least in part on the software versions, as described supra.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as introduction, rule design system, operators and rule grammar, domain rules, ensemble rules, etc.

Figure 9:
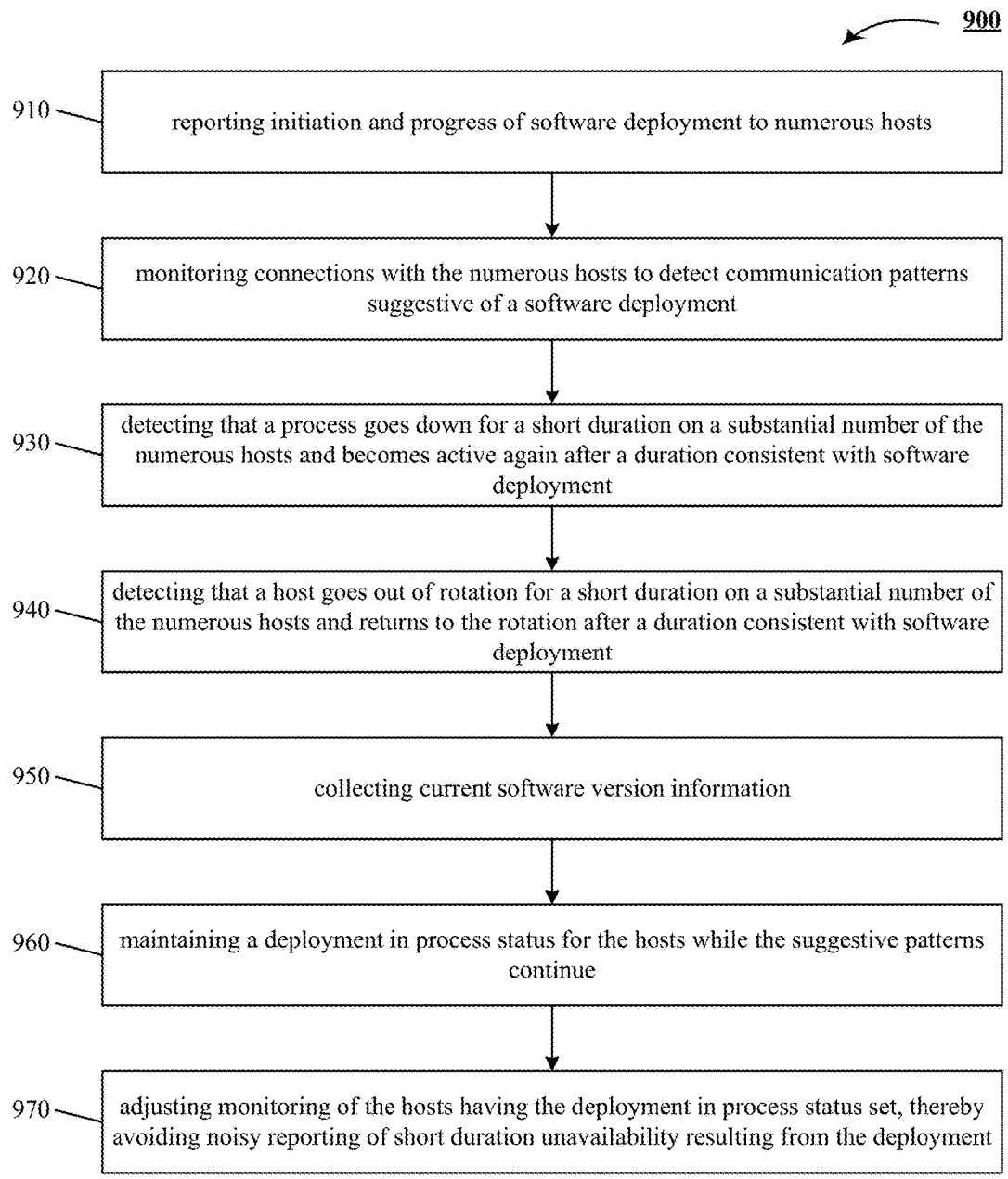

FIG. 9 shows one implementation of a flowchart 900. Flowchart 900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this workflow is described with reference to the system that carries out a method. The system is not necessarily part of the method.

At action 910, the method includes reporting initiation and progress of software deployment to numerous hosts, as described supra.

At action 920, the method includes monitoring connections with the numerous hosts to detect communication patterns suggestive of a software deployment, as described supra.

At action 930, the method includes detecting that a process goes down for a short duration on a substantial number of the numerous hosts and becomes active again after a duration consistent with software deployment, as described supra.

At action 940, the method includes detecting that a host goes out of rotation for a short duration on a substantial number of the numerous hosts and returns to the rotation after a duration consistent with software deployment, as described supra.

At action 950, the method includes collecting current software version information, as described supra.

At action 960, the method includes maintaining a deployment in process status for the hosts while the suggestive patterns continue, as described supra.

At action 970, the method includes adjusting monitoring of the hosts having the deployment in process status set, thereby avoiding noisy reporting of short duration unavailability resulting from the deployment, as described supra.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Computer System

Figure 10:
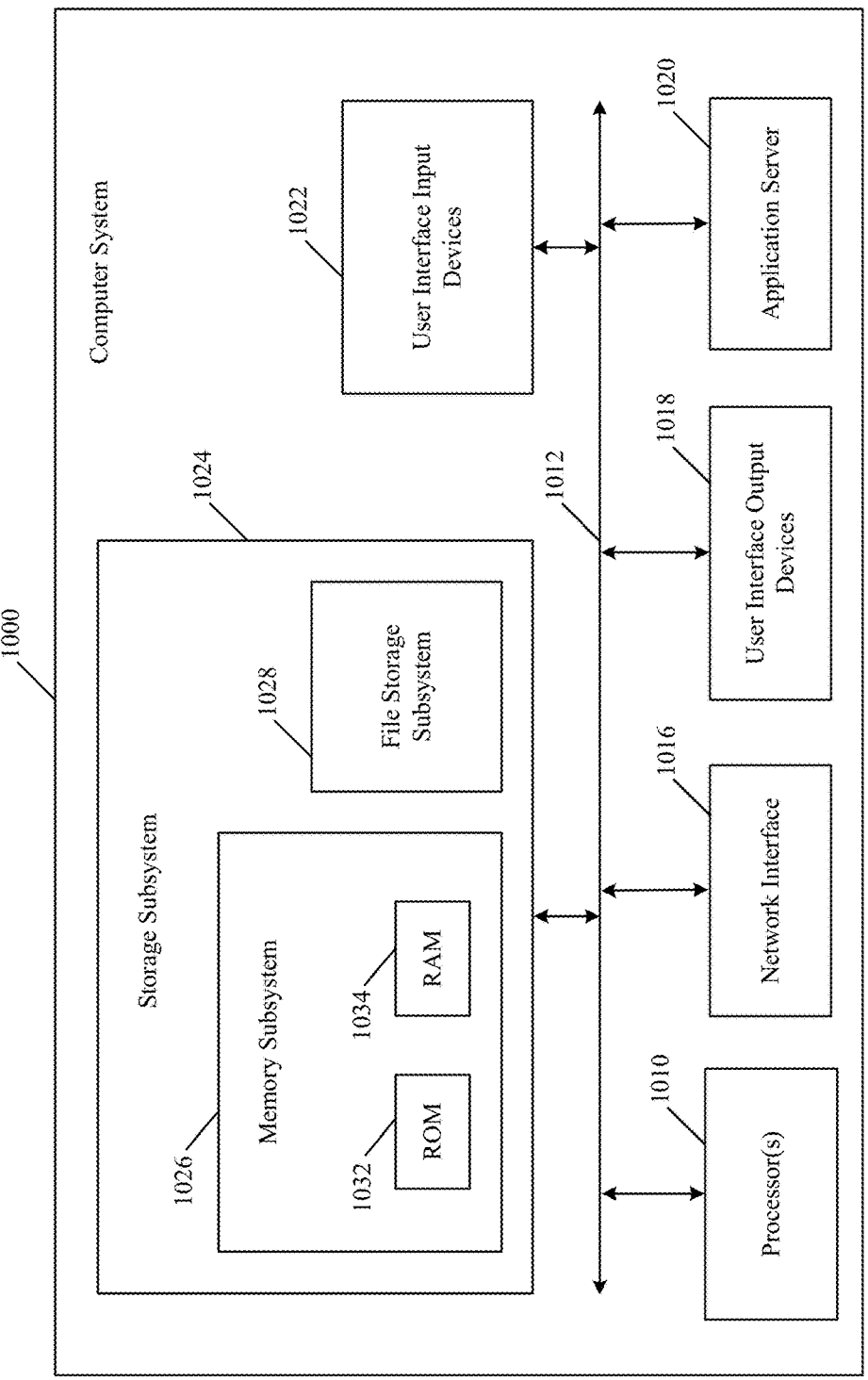
FIG. 10 is a block diagram of an example computer system for detecting anomalous behavior of network components in a complex network setting.

FIG. 10 is a block diagram 1000 of an example computer system 1000 for detecting anomalous behavior of network components in a complex network setting. Computer system 1000 typically includes at least one processor 1010 that communicates with a number of peripheral devices via bus subsystem 1012. These peripheral devices can include a storage subsystem 1024 including, for example, memory devices and a file storage subsystem, user interface input devices 1022, user interface output devices 1018, and a network interface subsystem 1016. The input and output devices allow user interaction with computer system 1000. Network interface subsystem 1016 provides an interface to outside networks, including an interface to corresponding interface devices in other computer systems.

User interface input devices 1022 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1000.

User interface output devices 1018 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1000 to the user or to another machine or computer system.

Storage subsystem 1024 stores programming and data constructs that provide the functionality of some or all of the modules and methods described herein. These software modules are generally executed by processor 1010 alone or in combination with other processors.

Memory 1026 used in the storage subsystem can include a number of memories including a main random access memory (RAM) 1034 for storage of instructions and data during program execution and a read only memory (ROM) 1032 in which fixed instructions are stored. A file storage subsystem 1028 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1028 in the storage subsystem 1024, or in other machines accessible by the processor.

Bus subsystem 1012 provides a mechanism for letting the various components and subsystems of computer system 1000 communicate with each other as intended. Although bus subsystem 1012 is shown schematically as a single bus, alternative implementations of the bus subsystem can use multiple busses. Application server 1020 can be a framework that allows the applications of computer system to run, with software running on hardware, e.g., the operating system.

Computer system 1000 can be of varying types including a workstation, server, computing cluster, blade server, server farm, or any other data processing system or computing device. Due to the ever-changing nature of computers and networks, the description of computer system 1000 depicted in FIG. 10 is intended only as one example. Many other configurations of computer system 1000 are possible having more or fewer components than the computer system depicted in FIG. 10.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of real-time tracking network topology changes, the method including:
    accessing from a network topology tracker a database that rolls up a network topology that includes the following components:
    processes running on numerous hosts and grouped into local services on the hosts;
    the local services running on multiple hosts and grouped into services; and
    network connections used by the services to connect the hosts and grouped into service connections;
    receiving at a network topology tracking queue, in real-time, filtered network feature data from data fetchers and processing the received data against the network topology, including:
    queuing new processes in the received data that are not present in the network topology to be classified into services after a new process threshold is reached;
    queuing new connections in the received data that are not present in the network topology to be classified into service connections after a new connection threshold is reached;
    queuing new instances of services in the received data that are not present in the network topology to be added to the network topology after a new instance threshold is reached;

queuing new service connections in the received data that are not present in the network topology to be added to the network topology after a new service connection threshold is reached; and matching processes, instances of services and service connections from the received data with the components of the network topology and updating a timestamp in the matching components;

periodically processing one or more queues from the received data to classify new processes into services after the new process threshold is reached and new connections into service connections after the new connection threshold is reached;

periodically processing by the network topology tracker one or more queues from the received data to add to the network topology new instances of services after the new instance threshold is reached and to add to the network topology new service connections after the new service connection threshold is reached;

periodically processing by the network topology tracker the network topology to remove out-of-date processes and self-depreciated processes, instances of services and service connections; and persisting an updated network topology after adding and removing from the network topology.

2. The method of claim 1, wherein the received data has been de-duplicated to reduce complementary views of a connection from opposite ends of the connection.

3. The method of claim 1, further including:
queuing new hosts in the received data that are not present in the network topology to be classified into services after a new host threshold is reached; and
periodically processing one or more queues from the received data to classify new hosts into services after the new host threshold is reached.

4. The method of claim 1, wherein the updated timestamp indicates when a process, instance of a service or a service connection was last seen and/or when a process, instance of a service or a service connection will expire.

5. The method of claim 1, further including:
queuing new apps of multiple services in the received data that are not present in the network topology to be added to the network topology after a new app threshold is reached; and
periodically processing by the network topology tracker one or more queues from the received data to add new apps to the network topology after the new app threshold is reached.

6. The method of claim 1, wherein at least one of the new connections includes a process endpoint on a host that does not report network feature data for network topology processing.

7. The method of claim 6, further including:
classifying the process endpoint and the host as an external process; and
adding the external process to the network topology.

8. The method of claim 1, wherein the new process threshold and the new connection threshold specify at least one of:
one or more time periods to pass before processing the new processes and the new connections from the queues; and
one or more periodic appearance criteria to satisfy before processing the new processes and the new connections from the queues.

9. A non-transitory computer readable storage medium impressed with computer program instructions, the instructions, when executed on a processor, implement the method of claim 1.

10. A system including one or more processors coupled to memory, the memory loaded with computer instructions, the instructions, when executed on the processors, implement actions of claim 1.

* * * * *